United States Patent
Murray et al.

(10) Patent No.: US 9,699,137 B2
(45) Date of Patent: Jul. 4, 2017

(54) NAMING OF CLOUD COMPONENTS

(71) Applicant: HEWLETT PACKARD ENTERPRISE DEVELOPMENT LP, Houston, TX (US)

(72) Inventors: Bryan P. Murray, Bellevue, WA (US); Mark Perreira, Sunnyvale, CA (US); Scott Wulf, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 106 days.

(21) Appl. No.: 14/701,441

(22) Filed: Apr. 30, 2015

(65) Prior Publication Data

US 2016/0323240 A1 Nov. 3, 2016

(51) Int. Cl.
G06F 15/16 (2006.01)
H04L 29/12 (2006.01)
H04L 29/08 (2006.01)

(52) U.S. Cl.
CPC .......... *H04L 61/2007* (2013.01); *H04L 61/15* (2013.01); *H04L 61/303* (2013.01); *H04L 67/16* (2013.01)

(58) Field of Classification Search
CPC .. H04L 61/30–61/3065; H04L 61/20–61/2015
See application file for complete search history.

(56) References Cited

U.S. PATENT DOCUMENTS

| 6,332,163 | B1 | 12/2001 | Bowman-Amuah | |
|---|---|---|---|---|
| 8,175,089 | B2 | 5/2012 | Hall et al. | |
| 8,775,626 | B2 | 7/2014 | Teather et al. | |
| 8,935,377 | B2 | 1/2015 | Glover et al. | |
| 9,319,292 | B2 * | 4/2016 | Wyatt | H04L 63/20 |
| 2005/0027712 | A1 * | 2/2005 | Gargi | G06F 17/30274 |
| 2011/0090896 | A1 | 4/2011 | Bradley | |
| 2012/0324094 | A1 * | 12/2012 | Wyatt | H04W 4/003 709/224 |
| 2014/0108648 | A1 | 4/2014 | Nelke et al. | |

(Continued)

OTHER PUBLICATIONS

Tanja Roth and Frank Sundemeyer, "SUSE Cloud 4 Deployment Guide," Jan. 26, 2015, pp. 1-143, Novell, Inc.

*Primary Examiner* — Brendan Higa
(74) *Attorney, Agent, or Firm* — Hewlett Packard Enterprise Patent Department (57) ABSTRACT

Examples disclosed herein relate to naming of cloud components. The examples enable generating, for a first node of a cloud infrastructure comprising a plurality of nodes, a first node name associated with a first fixed Internet Protocol (IP) address that is assigned to the first node, the first node name identifying the cloud infrastructure and a first control plane to which the first node belongs; generating, for a second node of the cloud infrastructure, a second node name associated with a second fixed IP address that is assigned to the second node, the second node name identifying the cloud infrastructure and a second control plane to which the second node belongs; and causing information related to the cloud infrastructure to be published to the plurality of nodes of the cloud infrastructure, the information related to the cloud infrastructure comprising the first node name and the second node name.

20 Claims, 6 Drawing Sheets

(56) References Cited

U.S. PATENT DOCUMENTS

2014/0164588 A1* 6/2014 Morphis ............. G06F 11/3006
                                                        709/223
2015/0301877 A1* 10/2015 Roth ....................... G06F 11/30
                                                        719/330

* cited by examiner

NAMING OF CLOUD COMPONENTS

BACKGROUND

Computing infrastructure service providers such as cloud service providers offer Internet-based computing where shared resources are provided to users as a service. Cloud computing, for example, enables provisioning of dynamically scalable and often virtualized resources on demand.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Computing infrastructure service providers such as cloud service providers offer network-based computing where shared resources are provided to users as a service. Cloud computing, for example, enables provisioning of dynamically scalable and often virtualized resources on demand. A "cloud infrastructure," as used herein, may describe various cloud components (e.g., nodes, services, networks, software applications, etc.) and their relationships in a cloud environment. As such, the cloud infrastructure, when successfully deployed, may set up and/or configure the various cloud components according to the infrastructure in the cloud environment.

In some instances, a large number of services having interdependency can be configured in a cloud infrastructure. Typically, the network address for a service is dynamically assigned to the service as the service is started. As such, the order of service startup can become very important because of the interdependency among many services. Because of the complexity in the interdependency among a large number of services, it may be technically challenging to determine the correct order of the service startup so that their network addresses (e.g., dynamically assigned as each of the services starts) are known for use by other services for their configuration (e.g., when the other services are configured).

Examples disclosed herein provide technical solutions to these technical challenges by generating names for cloud components. For example, the configuration of a service can be done using the service names generated for its dependent services without requiring the dependent services to be started (e.g., note that the dependent services are not assigned with dynamic network addresses until the dependent services are started). The examples disclosed herein enable generating, for a first node of a cloud infrastructure comprising a plurality of nodes, a first node name associated with a first fixed Internet Protocol (IP) address that is assigned to the first node. For example, the first node name identifying the cloud infrastructure and a first control plane to which the first node belongs. The examples further enable generating, for a second node of the cloud infrastructure, a second node name associated with a second fixed IP address that is assigned to the second node. For example, the second node name may identify the cloud infrastructure and a second control plane to which the second node belongs. The examples further enable causing information related to the cloud infrastructure to be published to the plurality of nodes of the cloud infrastructure where the information related to the cloud infrastructure comprises the first node name and the second node name.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 1:
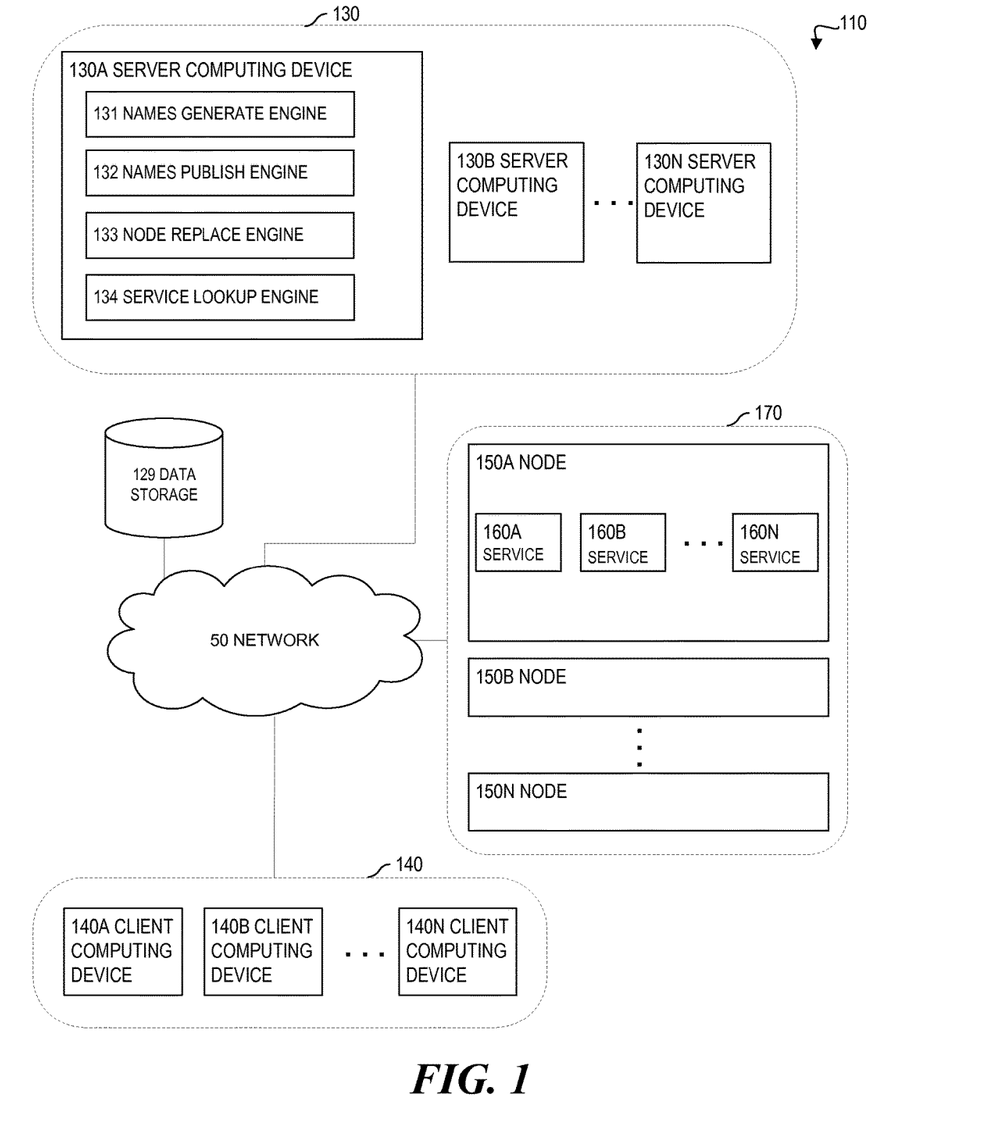
FIG. 1 is a block diagram depicting an example system comprising various components including a server computing device, a client computing device, and a cloud infrastructure comprising various cloud components.

FIG. 1 is a block diagram depicting an example system 110 comprising various components including a server computing device, a client computing device, and a cloud infrastructure comprising various cloud components.

The various components of system 110 may include client computing devices 140 (illustrated as 140A, 140B, . . . , 140N) and server computing devices 130 (illustrated as server computing device 130A, 130B, . . . , 130N). Each client computing device 140A, 140B, . . . , 140N may communicate requests to and/or receive responses from server computing device 130. Server computing device 130 may receive and/or respond to requests from client computing devices 140. Client computing devices 140 may include any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components of system 110 may include a cloud infrastructure 170. A "cloud infrastructure," as used herein, may comprise various cloud components including, for example, nodes (illustrated as 150A, 150B, . . . , 150N), services (illustrated as 160A, 160B, . . . , 160N), networks, and/or software programs. A node may represent a physical or virtual node.

The various components of system 110 (e.g., components 129, 130, 140, and/or 170) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, system 110 and the various components described herein may be implemented in hardware and/or programming that configures hardware. Furthermore, in FIG. 1 and other Figures described herein, different numbers of components or entities than depicted may be used.

Server computing device 130 may comprise a names generate engine 131, a names publish engine 132, a node replace engine 133, a service lookup engine 134, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Names generate engine 131 may generate, for a particular node (e.g., node 150A) of a cloud infrastructure (e.g., cloud infrastructure 170), a node name associated with a fixed Internet Protocol (IP) address that is assigned to the particular node. A "cloud infrastructure," as used herein, may comprise various cloud components including, for example, a plurality of nodes (illustrated as 150A, 1508, . . . , 150N), services (illustrated as 160A, 160B, . . . , 160N), networks, and/or software programs. A node may represent a physical or virtual node.

A plurality of (and/or a range of) fixed IP addresses may be available for the cloud infrastructure. For example, the plurality of available fixed IP addresses may include 7 fixed IP addresses ranged from 111.222.333.444.00 to 111.222.333.444.07. As used herein, an IP address is "fixed" because the IP address is assigned to a node at an initial configuration (and/or set-up) of the node (e.g., prior to the node being started and/or being ready for provisioning). A fixed IP address can be distinguished from an IP address that is dynamically assigned to a node at the time the node is started. The fixed IP address may not change (e.g., remain "fixed") even after the node is started.

For example, names generate engine 131 may select and/or assign, at an initial configuration of the cloud infrastructure and/or a first node, one fixed IP address (e.g., a first fixed IP address) from the plurality of available fixed IP addresses to the first node. At the initial configuration of the cloud infrastructure and/or a second node, another fixed IP address (e.g., a second fixed IP address) from the plurality of available fixed IP addresses may be selected and/or assigned to the second node. If a new node (e.g., a third node) is added to the cloud infrastructure after the initial configuration of the cloud infrastructure, names generate engine 131 may select and/or assign a third fixed IP address from the plurality of available fixed IP addresses to the third node.

In some implementations, the node name generated for the particular node may be associated with the fixed IP address assigned to the particular node. In other words, the node name may uniquely identify the fixed IP address and/or the particular node that the fixed IP address is assigned to.

The node name may be made descriptive to allow system 110 and/or users of system 110 to be informed of various aspects of the particular node. For example, the node name may identify a cloud infrastructure, a control plane, a control plane tier, a control plane tier member, a network, and/or other information related to the particular node. A cloud infrastructure may comprise a single control plane or a plurality of control planes. A "control plane," as used herein, may refer to a set of networks, nodes, services, etc. This set of networks, nodes, services, etc. on the control plane may be organized in different tiers. As such, the control plane may comprise a single or a plurality of control plane tiers where each tier has a subset of this set of networks, nodes, services, etc. on the control plane. For example, each control plane tier may comprise a single or a plurality of tier members. Each tier member may represent a node.

One example representation of the node name of the particular node may be as follows: COBBLER1-CCP-T1-M1-NETCLM. COBBLER1 may indicate an identification of the cloud infrastructure that the particular node belongs to, CCP may indicate an identification of the control plane that the particular node belongs to, T1 may indicate an identification of the control plane tier that the particular node belongs to, and M1 may indicate that the particular node is a member of the control plane tier T1. NETCLM may indicate the name of the network that the particular node is connected to. Note that the node may be connected to more than one network. In that case, the particular node may have more than one node names: COBBLER1-CCP-T1-M1-NETCLM, COBBLER1-CCP-T1-M1-NETCAN, COBBLER1-CCP-T1-M1-NETTUL, etc.

Consider another example: a first node has a node name of COBBLER1-CCP-T1-M1-NETCLM. There may be a second node that is located in the same control plane and the same control plane tier. In that case, the second node may be associated with a second node name such as COBBLER1-CCP-T1-M2-NETCLM that may describe that the second node is another member (e.g., M2) of the control plane tier T1. Note that the first and second nodes may belong to the same control plane and the same control plane tier (e.g., like in the previous example), the same control plane but different control plane tiers, or different control planes all together (e.g., and in turn different control plane tiers).

In some implementations, as discussed below with respect to node replace engine 133, if the particular node is replaced by another node (e.g., due the failure of the particular node), the fixed IP address that was assigned to the particular node and the node name generated for the particular node may be assigned to the replacing node (e.g., the node that replaced the particular node).

Names generate engine 131 may generate, for a particular service, a service name. A "service," as used herein, may refer to a set of software programs that may enable a node to serve a particular role and/or function in the cloud infrastructure. For example, a service may be a set of database programs that enable a node to serve as a storage node in the cloud infrastructure. As such, a service may be classified into various types of services depending on the role, function, and/or other aspects of the service. A node (e.g., node 150A) may include a single service or a plurality of services (e.g., illustrated as 160A, 160B, . . . , 160N) running on the node.

The service name generated for the particular service may identify a cloud infrastructure, a control plane, a control plane tier, a virtual IP address, a service type, a network, and/or other information related to the particular service. Assuming that the particular service runs on the first node (e.g., COBBLER1-CCP-T1-M1-NETCLM), one example representation of the service name may be as follows: COBBLER1-CCP-T1-VIP-NOV-API-NETCLM. COBBLER1 may indicate an identification of the cloud infrastructure that the first node belongs to, CCP may indicate an identification of the control plane that the first node belongs to, and T1 may indicate an identification of the control plane tier that the first node belongs to. NOV-API may indicate the type of the particular service. For example, NOV-API may indicate that the particular service is a nova service related to API.

VIP in the above service name may indicate the virtual IP address of a service cluster (e.g., this service cluster has at least the particular service). A service cluster may comprise a single service or a plurality of services. To describe the concept of the virtual IP address, it may be helpful to understand the concept of service instances and service cluster. A service may comprise a plurality of service instances. Note that the plurality of service instances represent the same service and are copies (or instances) of the same service. As such, the plurality of service instances may share the same service name.

The plurality of service instances may be scattered throughout a plurality nodes. For example, a first service (e.g., COBBLER1-CCP-T1-VIP-NOV-API-NETCLM) may comprise 3 service instances (e.g., a first service instance, a second service instance, and a third service instance). The 3 service instances may be located in the same node or different nodes. For example, the first service instance may be located in a first node, the second service instance may be located in a second node, and the third service instance may be located in a third node. Note that the first, second, and third nodes in this example may belong to the same control plane and the same control plane tier, the same control plane but different control plane tiers, or different control planes all together (e.g., and in turn different control plane tiers). There may be a second service (e.g., COBBLER1-CCP-T1-VIP-NEU-API-NETCLM, note a different service type, "NEU-API", in this service name generated for the second service). The second service may also have 3 service instances that are scattered throughout the same set of nodes as the 3 service instances of the first service (e.g., the same set of nodes meaning the first, second, and third nodes). In this case, the first service and second service may be said to be in the same service cluster. As such, the VIP in the service names for the first and second services may be the same because the VIP represents the same service cluster that both of the first and second services belong to.

In some implementations, which IP address to use for the virtual IP address may depend on the availability of the fixed IP addresses (e.g., as discussed above with respect to generating node names). For example, names generate engine 131 may select and/or assign a fixed IP address from the plurality of available fixed IP addresses as the virtual IP address to be used for a particular service cluster.

Further, NETCLM in the above service name may indicate the name of the network that the first node is connected to. Note that the node may be connected to more than one network. In that case, the particular service may have more than one service names: COBBLER1-CCP-T1-VIP-NOV-API-NETCLM, COBBLER1-CCP-T1-VIP-NOV-API-NETCAN, COBBLER1-CCP-T1-VIP-NOV-API-NETTUL, etc.

Generating a service name for a particular service is advantageous, for example, when a large number of services having interdependency are configured in a cloud infrastructure. Typically, the network address for a service is dynamically assigned to the service as the service is started. As such, the order of service startup can become very important because of the interdependency among many services. Because of the complexity in the interdependency among a large number of services, it may be technically challenging to determine the correct order of the service startup so that their network addresses (e.g., dynamically assigned as each of the services starts) are known for use by other services for their configuration (e.g., when the other services are configured). With the service name generated by name generate engine 131 herein, the configuration of a service can be done using the service names generated for its dependent services without requiring the dependent services to be started (e.g., note that the dependent services are not assigned with dynamic network addresses until the dependent services are started).

Names publish engine 132 may cause information related to the cloud infrastructure to be published to the plurality of nodes (illustrated as 150A, 150B, . . . , 150N) of the cloud infrastructure. The information related to the cloud infrastructure may comprise, for example, a node name (e.g., generated by names generate engine 131) and/or a service name (e.g., generated by names generate engine 131). The information related to the cloud infrastructure may comprise the node names of more than one node and/or the service names for more than one service. The information related to the cloud infrastructure may be published to the plurality of nodes in various ways. For example, names publish engine 132 may generate a data file that may be populated with the information related to the cloud infrastructure (e.g., node names and/or service names in the cloud infrastructure). The data file (or a copy thereof) may be stored in each of the plurality of nodes.

Node replace engine 133 may assign the node name and/or the fixed IP address of the particular node to another node that replaces the particular node. For example, node replace engine 133 may determine that a first node should be replaced by a second node (e.g., due to the failure of the first node). In response to determining that the first node should be replaced by the second node, node replace engine 133 may assign the node name and/or the fixed IP address associated with the first node to the second node. As such, the second node may assume the particular role and/or function that the first node served in the cloud infrastructure while using the same node name and/or fixed IP address.

Service lookup engine 134 may identify a new service to be added to the cloud infrastructure (e.g., therefore needs to be configured) and/or an existing service to be re-configured. In these instances, the configuration and/or re-configuration of the particular service may require the network addresses of its dependent services (e.g., having interdependency or a dependency relationship with the particular service) to be known. Because the information related to the cloud infrastructure has been published to the plurality of nodes (e.g. as discussed above with respect to names publish engine 132), the service names associated with the dependent services may be readily available for use by the particular service for the purpose of configuring the particular service. As such, the configuration of the particular service can be done using the services names generated for its dependent services without requiring the dependent services to be started (e.g., note that the dependent services are not assigned with dynamic network addresses until the dependent services are started).

In performing their respective functions, engines 131-134 may access data storage 129 and/or other suitable database (s). Data storage 129 and/or other database may represent any memory accessible to system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. System 110 may access data storage 129 locally or remotely via network 50 or other networks.

Data storage 129 and/or other database may include a database to organize and store data. The database may reside in a single or multiple physical device(s) and in a single or multiple physical location(s). The database may store a plurality of types of data and/or files and associated data or file description, administrative information, or any other data.

Figure 2:
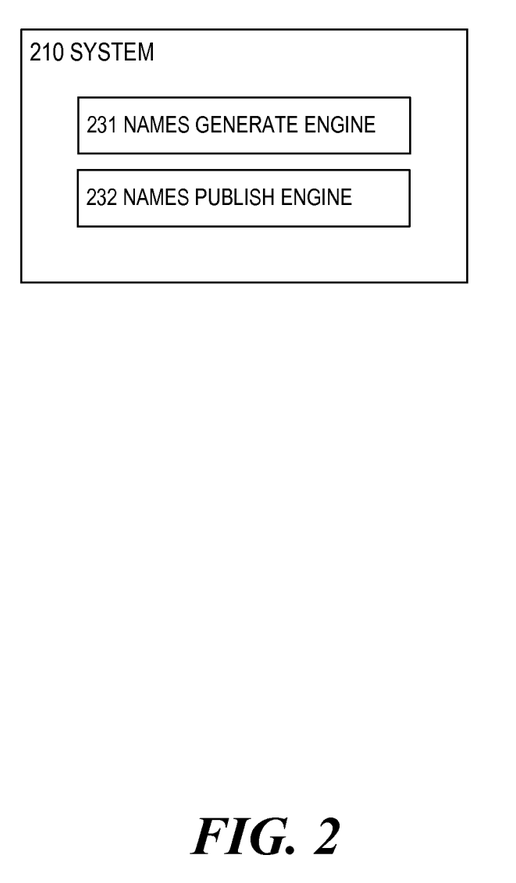
FIG. 2 is a block diagram depicting an example system for naming of cloud components.

FIG. 2 is a block diagram depicting an example system 210 for naming of cloud components. System 210 may comprise a names generate engine 231, a names publish engine 232, and/or other engines. Engines 231-232 represent engines 131-132, respectively.

Figure 3:
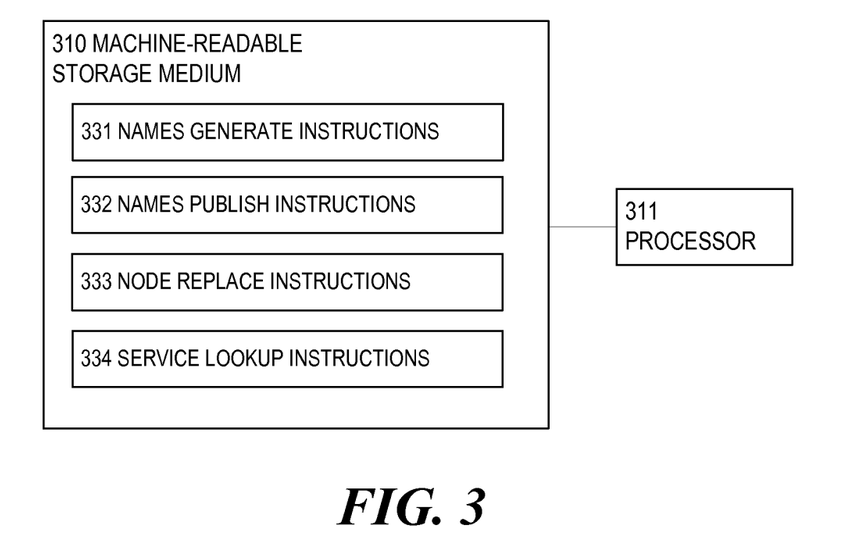
FIG. 3 is a block diagram depicting an example machine-readable storage medium comprising instructions executable by a processor for naming of cloud components.

FIG. 3 is a block diagram depicting an example machine-readable storage medium 310 comprising instructions executable by a processor for naming of cloud components.

In the foregoing discussion, engines 131-134 were described as combinations of hardware and programming. Engines 131-134 may be implemented in a number of fashions. Referring to FIG. 3, the programming may be processor executable instructions 331-334 stored on a machine-readable storage medium 310 and the hardware may include a processor 311 for executing those instructions. Thus, machine-readable storage medium 310 can be said to store program instructions or code that when executed by processor 311 implements engines 131-134 of FIG. 1.

In FIG. 3, the executable program instructions in machine-readable storage medium 310 are depicted as names generate instructions 331, names publish instructions 332, node replace instructions 333, and service lookup instructions 334. Instructions 331-334 represent program instructions that, when executed, cause processor 311 to implement engines 131-134, respectively.

Figure 4:
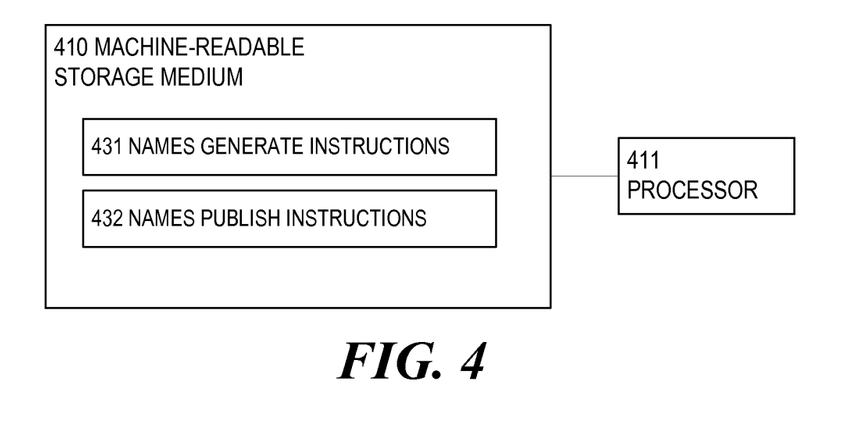
FIG. 4 is a block diagram depicting an example machine-readable storage medium comprising instructions executable by a processor for naming of cloud components.

FIG. 4 is a block diagram depicting an example machine-readable storage medium 410 comprising instructions executable by a processor for naming of cloud components.

In the foregoing discussion, engines 131-134 were described as combinations of hardware and programming. Engines 131-134 may be implemented in a number of fashions. Referring to FIG. 4, the programming may be processor executable instructions 431-432 stored on a machine-readable storage medium 410 and the hardware may include a processor 411 for executing those instructions. Thus, machine-readable storage medium 410 can be said to store program instructions or code that when executed by processor 411 implements engines 131-134 of FIG. 1.

In FIG. 4, the executable program instructions in machine-readable storage medium 410 are depicted as names generate instructions 431 and names publish instructions 432. Instructions 431-432 represent program instructions that, when executed, cause processor 411 to implement engines 131-132, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 331-334, and/or other instructions. As an alternative or in addition to retrieving and executing instructions, processor 311 may include at least one electronic circuit comprising a number of electronic components for performing the functionality of at least one of instructions 331-334, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 431-432, and/or other instructions. As an alternative or in addition to retrieving and executing instructions, processor 411 may include at least one electronic circuit comprising a number of electronic components for performing the functionality of at least one of instructions 431-432, and/or other instructions.

Figure 5:
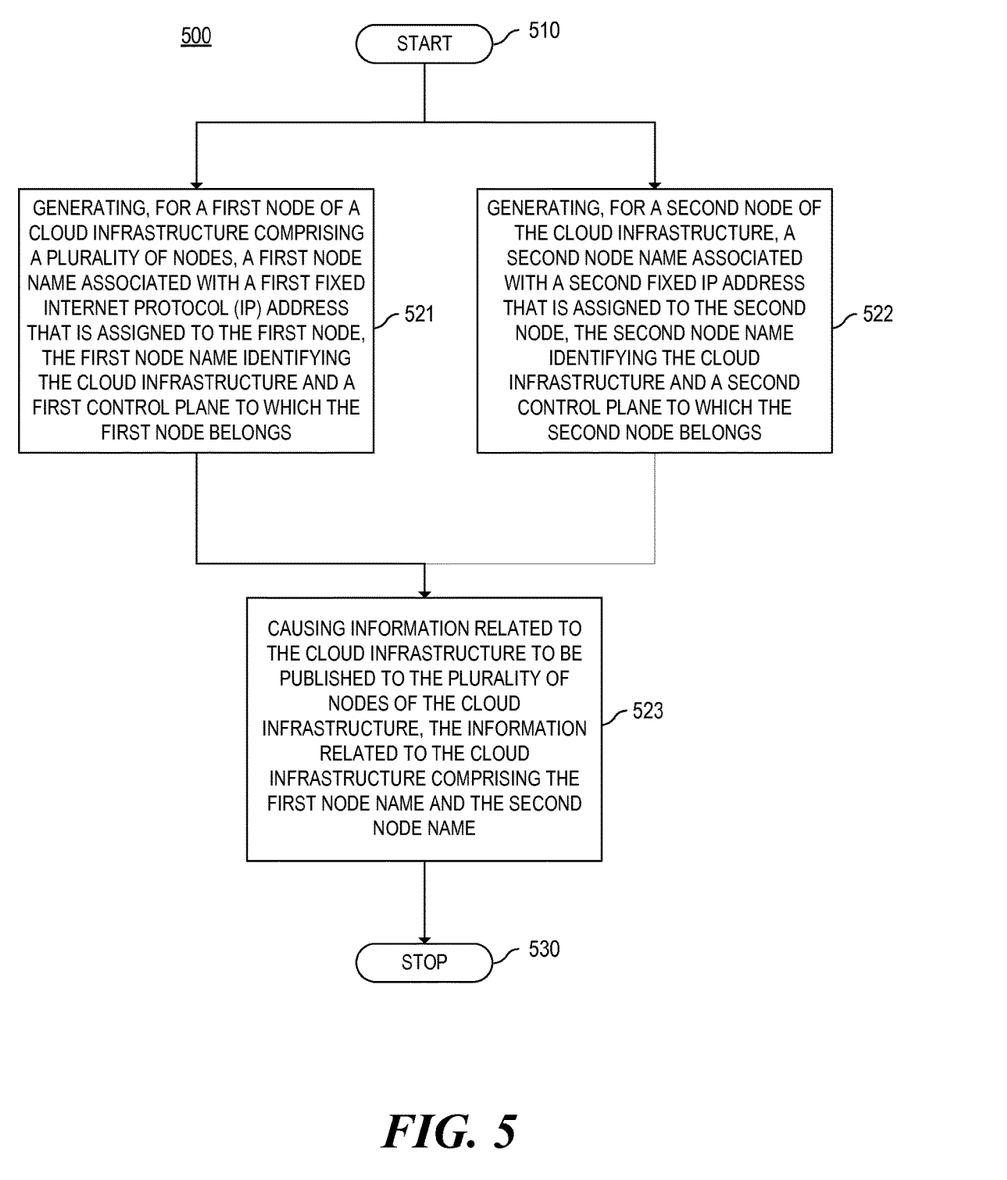
FIG. 5 is a flow diagram depicting an example method for naming of cloud components.

FIG. 5 is a flow diagram depicting an example method 500 for naming of cloud components. The various processing blocks and/or data flows depicted in FIG. 5 (and in the other drawing figures such as FIGS. 6-7) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 310, and/or in the form of electronic circuitry.

Method 500 may start in block 510 and proceed to block 521 and/or block 522. In block 521, method 500 may include generating, for a first node of a cloud infrastructure comprising a plurality of nodes, a first node name associated with a first fixed Internet Protocol (IP) address that is assigned to the first node. The first node name may identify the cloud infrastructure and a first control plane to which the first node belongs. Referring back to FIG. 1, names generate engine 131 may be responsible for implementing block 521.

In block 522, method 500 may include generating, for a second node of the cloud infrastructure, a second node name associated with a second fixed IP address that is assigned to the second node. The second node name may identify the cloud infrastructure and a second control plane to which the second node belongs. Referring back to FIG. 1, names generate engine 131 may be responsible for implementing block 522.

In block 523, method 500 may include causing information related to the cloud infrastructure to be published to the plurality of nodes of the cloud infrastructure. The information related to the cloud infrastructure may comprise the first node name and the second node name. Referring back to FIG. 1, names publish engine 132 may be responsible for implementing block 523. Method 500 may stop in block 530.

Figure 6:
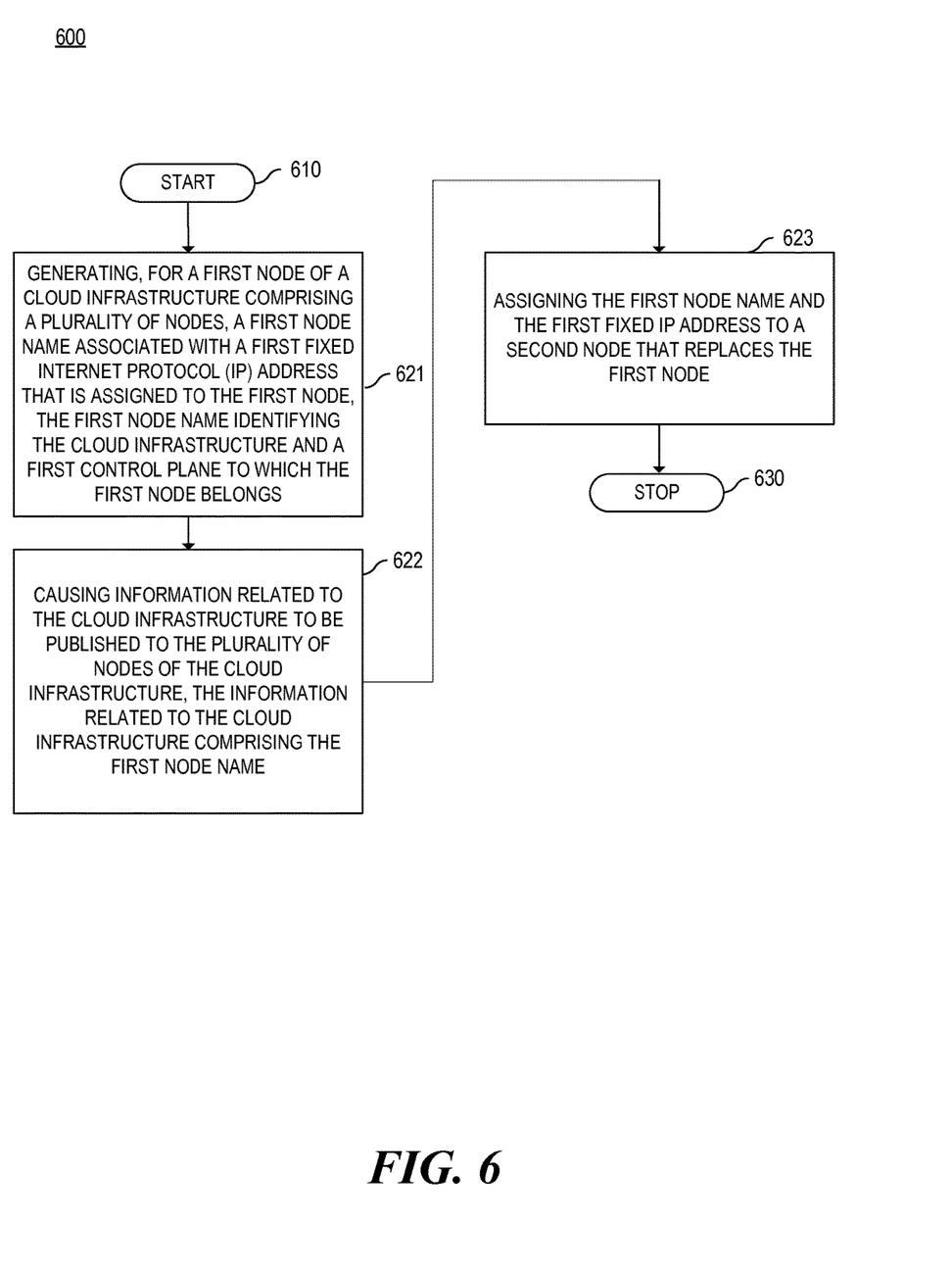
FIG. 6 is a flow diagram depicting an example method for naming of cloud components.

FIG. 6 is a flow diagram depicting an example method 600 for naming of cloud components. Method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

Method 600 may start in block 610 and proceed to block 621. In block 621, method 600 may include generating, for a first node of a cloud infrastructure comprising a plurality of nodes, a first node name associated with a first fixed Internet Protocol (IP) address that is assigned to the first node. The first node name may identify the cloud infrastructure and a first control plane to which the first node belongs. Referring back to FIG. 1, names generate engine 131 may be responsible for implementing block 621.

In block 622, method 600 may include causing information related to the cloud infrastructure to be published to the plurality of nodes of the cloud infrastructure. The information related to the cloud infrastructure may comprise the first node name. Referring back to FIG. 1, names publish engine 132 may be responsible for implementing block 622.

In block 623, method 600 may include assigning the first node name and the first fixed IP address to a second node that replaces the first node. Referring back to FIG. 1, node replace engine 133 may be responsible for implementing block 623. Method 600 may stop in block 630.

Figure 7:
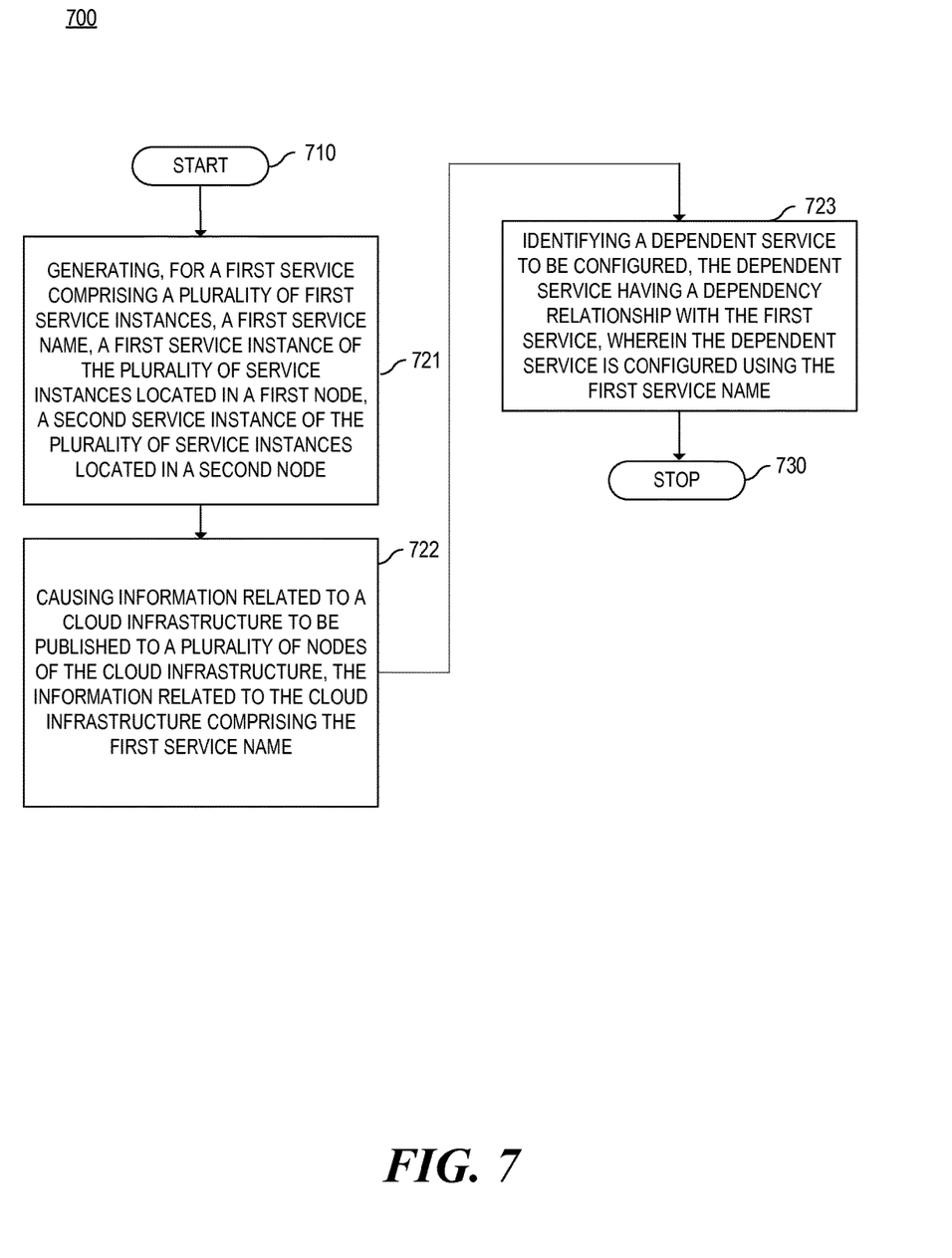
FIG. 7 is a flow diagram depicting an example method for naming of cloud components.

FIG. 7 is a flow diagram depicting an example method 700 for naming of cloud components. Method 700 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

Method 700 may start in block 710 and proceed to block 721. In block 721, method 700 may include generating, for a first service comprising a plurality of first service instances, a first service name that identifies a cloud infrastructure comprising a plurality of nodes, a virtual IP address, and a first service type. A first service instance of the plurality of first service instances may be located in a first node of the cloud infrastructure, and a second service instance of the plurality of service instances may be located in a second node of the cloud infrastructure. Referring back to FIG. 1, names generate engine 131 may be responsible for implementing block 721.

In block 722, method 600 may include causing information related to a cloud infrastructure to be published to a plurality of nodes of the cloud infrastructure. The information related to the cloud infrastructure may comprise the first service name. Referring back to FIG. 1, names publish engine 132 may be responsible for implementing block 722.

In block 723, method 700 may include identifying a dependent service to be configured where the dependent service has a dependency relationship with the first service. The dependent service may be configured using the first service name (e.g., published in block 722). Referring back to FIG. 1, service lookup engine 134 may be responsible for implementing block 723. Method 700 may stop in block 730.

The foregoing disclosure describes a number of example implementations for naming of cloud components. The disclosed examples may include systems, devices, computer-readable storage media, and methods for naming of cloud components. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for naming of cloud components, the method comprising:
   generating, for a first node of a cloud infrastructure comprising a plurality of nodes, a first node name associated with a first fixed Internet Protocol (IP) address that is assigned to the first node, the first node name identifying the cloud infrastructure and a first control plane to which the first node belongs;
   generating, for a second node of the cloud infrastructure, a second node name associated with a second fixed IP address that is assigned to the second node, the second node name identifying the cloud infrastructure and a second control plane to which the second node belongs; and
   causing information related to the cloud infrastructure to be published to the plurality of nodes of the cloud infrastructure, the information related to the cloud infrastructure comprising the first node name and the second node name.

2. The method of claim 1, wherein a plurality of fixed IP addresses is available for the cloud infrastructure, further comprising:
   assigning, at an initial configuration of the cloud infrastructure, the first fixed IP address of the plurality of fixed IP addresses to the first node; and
   assigning, at the initial configuration of the cloud infrastructure, the second fixed IP address of the plurality of fixed IP addresses to the second node.

3. The method of claim 2, further comprising:
   identifying a third node to be added to the cloud infrastructure after the initial configuration of the cloud infrastructure;
   assigning a third fixed IP address of the plurality of fixed IP addresses to the third node; and
   generating, for the third node, a third node name associated with the third fixed IP address, the third node name identifying the cloud infrastructure and a third control plane to which the third node belongs.

4. The method of claim 1, further comprising:
   determining that the first node should be replaced by a fourth node; and
   in response to determining that the first node should be replaced by the fourth node, assigning the first node name and the first fixed IP address to the fourth node.

5. The method of claim 1, further comprising:
   generating, for a first service comprising a plurality of service instances, a first service name, a first service instance of the plurality of service instances located in the first node, a second service instance of the plurality of service instances located in the second node.

6. The method of claim 5, wherein the first service name identifies the cloud infrastructure, a virtual IP address, and a service type.

7. The method of claim 5, further comprising:
   identifying a second service to be added to the cloud infrastructure or to be re-configured; and
   determining that the second service has a dependency relationship with the first service, wherein the second service is configured using the first service name.

8. The method of claim 1, wherein the first node name identifies a first control plane tier of which the first node is a member, and wherein the second node name identifies a second control plane tier of which the second node is a member.

9. The method of claim 8, wherein the first and second control planes are the same and the first and second control plane tiers are the same, and wherein the first node name identifies that the first node is a first member of the same control plane tier and the second node is a second member of the same control plane tier.

10. The method of claim 1, wherein the first node name identifies a first network to which the first node is connected, further comprising:
    generating, for the first node, a fourth node name associated with the first fixed IP address that is assigned to the first node, the fourth node name identifying the cloud infrastructure, the first control plane to which the first node belongs, and a second network to which the first node is connected.

11. A non-transitory machine-readable storage medium comprising instructions executable by a processor of a computing device for naming of cloud components, the machine-readable storage medium comprising:
    instructions to generate, for a first service comprising a plurality of first service instances, a first service name that identifies a cloud infrastructure comprising a plurality of nodes, a virtual IP address, and a first service type, a first service instance of the plurality of first service instances located in a first node of the cloud infrastructure, a second service instance of the plurality of service instances located in a second node of the cloud infrastructure;
    instructions to generate, for a second service comprising a plurality of second service instances, a second service name that identifies the cloud infrastructure, the virtual IP address, and a second service type, a third service instance of the plurality of second service instances located in the first node, a fourth service instance of the plurality of second service instances located in the second node; and
    instructions to cause information related to the cloud infrastructure to be published to the plurality of nodes of the cloud infrastructure, the information related to the cloud infrastructure comprising the first service name and the second service name.

12. The non-transitory machine-readable storage medium of claim 11, further comprising:
    determining that the second service should be configured; and
    determining that the second service has a dependency relationship with the first service, wherein the second service is configured using the first service name.

13. The non-transitory machine-readable storage medium of claim 11, wherein the virtual IP address represents a service cluster having at least the first service and the second service, the plurality of first service instances and the plurality of second service instances located in the same set of nodes of the cloud infrastructure.

14. The non-transitory machine-readable storage medium of claim 11, wherein a plurality of fixed IP addresses is available for the cloud infrastructure, further comprising:
    assigning a fixed IP address of the plurality of fixed IP addresses as the virtual IP address.

15. The non-transitory machine-readable storage medium of claim 11, the first service name identifies a first network to which the first node is connected, further comprising:
   generating, for the first service, a third service name that identifies the cloud infrastructure, the virtual IP address, the first service type, and a second network to which the first node is connected.

16. A system for naming of cloud components comprising:
   a processor; and
   a non-transitory machine-readable storage medium comprising instructions executable by the processor to:
   generate, for a first node of a cloud infrastructure comprising a plurality of nodes, a node name associated with a first fixed Internet Protocol (IP) address that is assigned to the first node, the node name identifying the cloud infrastructure and a control plane to which the first node belongs;
   generate, for a service comprising a plurality of service instances, a service name that identifies the cloud infrastructure, a second fixed IP address, and a service type, a service instance of the plurality of service instances located in the first node; and
   cause information related to the cloud infrastructure to be published to the plurality of nodes of the cloud infrastructure, the information related to the cloud infrastructure comprising the node name and the service name.

17. The system of claim 16, wherein causing the information related to the cloud infrastructure to be published to the plurality of nodes further comprises:
   generating a data file that is populated with the information related to the cloud infrastructure; and
   causing the data file to be stored in each of the plurality of nodes.

18. The system of claim 16, the non-transitory machine-readable storage medium comprising instructions executable by the processor to:
   assign the node name and the first fixed IP address to a second node that replaces the first node.

19. The system of claim 16, the non-transitory machine-readable storage medium comprising instructions executable by the processor to:
   identify a dependent service to be configured, the dependent service having a dependency relationship with the service, wherein the dependent service is configured using the service name.

20. The system of claim 16, wherein a plurality of fixed IP addresses is available for the cloud infrastructure, the non-transitory machine-readable storage medium comprising instructions executable by the processor to:
   assign the first fixed IP address of the plurality of fixed IP addresses to the first node; and
   assign the second fixed IP address of the plurality of fixed IP addresses as a virtual IP address of a service cluster, the service cluster having at least the service.

* * * * *